United States Patent [19]

Höfgen et al.

[11] Patent Number: 5,363,109
[45] Date of Patent: Nov. 8, 1994

[54] METHOD OF CORRECTING MEASUREMENT ERRORS CAUSED BY CLOCK DEVIATIONS IN A SECONDARY RADAR SYSTEM

[75] Inventors: Günter Höfgen, Kornwestheim; Rudiger Zeitz, Ditzingen, both of Germany

[73] Assignee: Alcatel Sel Aktiengesellschaft, Stuttgart, Germany

[21] Appl. No.: 97,595

[22] Filed: Jul. 23, 1993

Related U.S. Application Data

[63] Continuation-in-part of Ser. No. 29,922, Mar. 11, 1993, abandoned, which is a continuation of Ser. No. 858,554, Mar. 27, 1992, abandoned.

[30] Foreign Application Priority Data

Mar. 27, 1991 [DE] Germany ............................ 4109981
Jul. 25, 1992 [DE] Germany ............................ 4224645

[51] Int. Cl.$^5$ ......................... G01S 13/76; G01S 13/91
[52] U.S. Cl. ........................................ 342/31; 342/37; 342/38
[58] Field of Search ..................... 342/31, 32, 37, 38

[56] References Cited

U.S. PATENT DOCUMENTS

| | | | |
|---|---|---|---|
| 3,388,393 | 6/1968 | Graham et al. | 342/31 |
| 3,409,889 | 11/1968 | Graham | 342/31 |
| 3,521,279 | 7/1970 | Michnik | 342/31 |
| 3,705,404 | 12/1972 | Chisholm | 342/31 |
| 3,766,552 | 10/1973 | Hajduk | 342/37 |
| 3,943,509 | 3/1976 | Pudsey | 342/37 |
| 4,197,536 | 4/1980 | Levine . | |
| 4,319,243 | 3/1982 | Vachenauer et al. . | |
| 4,768,036 | 8/1988 | Litchford et al. . | |

FOREIGN PATENT DOCUMENTS

| | | |
|---|---|---|
| 2559273 | 8/1985 | France . |
| 0016417A3 | 10/1980 | Germany . |
| 4109981 | 10/1992 | Germany . |

OTHER PUBLICATIONS

Aeronautical Telecommunications, (International Civil Aviation Organization Specification) Annex 10, vol. I, Part I, Chapter 3.8.2, pp. 47–54, (Apr. 1985), Canada.

*Primary Examiner*—Gilberto Barrón, Jr.
*Attorney, Agent, or Firm*—Frishauf, Holtz, Goodman & Woodward

[57] ABSTRACT

Conventional secondary radar systems use mechanically rotating antennas to radiate a concentrated beam that rotates in a horizontal plane. Data exchange between ground stations and airborne transponders can only take place if the aircraft is struck by the antenna lobe. The distance from the aircraft to the ground station is determined from the signal transit time. Directional information is derived from the antenna position. The secondary radar system according to the invention uses an omnidirectional antenna, so that data can be exchanged between ground station and aircraft at any time. To determine the position of the aircraft, interrogation signals are transmitted by a single active ground station such that the reply signal from a transponder falls within the common system time frame of the ground station. The times of arrival of the reply signals at different ground stations are then directly proportional to the distances from the aircraft to these ground stations.

Measurement errors caused by clock deviations are corrected by determining any deviation of the clocks of two ground stations from each other. To correct clock deviations, two interrogation/reply cycles are used in direct succession in opposite directions over a common transmission path. The two transmission periods will differ by twice the deviation of the clocks in the two ground stations. The measured deviation is used to correct the measured transit time values and/or to synchronize the clocks. Synchronization of several ground stations with a master station can be achieved by using successive interrogation/reply cycles between the master station and all other stations.

23 Claims, 7 Drawing Sheets

METHOD OF CORRECTING MEASUREMENT ERRORS CAUSED BY CLOCK DEVIATIONS IN A SECONDARY RADAR SYSTEM

This application is a continuation-in-part of application Ser. No. 08/029,922, filed Mar. 11, 1993, now abandoned, which is a continuation of U.S. Ser. No. 07/858,554, filed Mar. 27, 1992, now abandoned.

BACKGROUND OF THE INVENTION

1. Field of the Invention

The present invention relates to a secondary radar system particularly for Mode S operation, as is used for air surveillance and required by the ICAO Specification, Annex 10, Part 1, Chapter 3.8.2 and a method for maintaining synchronism within such a secondary radar system.

2. Description of the Prior Art

The construction and operation of secondary radar systems, henceforth called "SSR systems", are well known in the art.

SSR systems consist of ground stations and airborne stations. The ground stations send out interrogation signals via a rotating unidirectional antenna. If these interrogation signals are received by an airborne station, the latter will transmit reply signals after a fixed delay. These reply signals contain, for example, information on the altitude, temperature, and speed of an aircraft equipped with the airborne station, which is also called "transponder". The ground station locates the aircraft by measuring the elapsed time between the transmission of the interrogation signal and the reception of the reply signal and by means of the altitude data contained in the reply signal. Directional information is derived from the position of the rotating antenna. The data-link capability of this system is considerably improved if the transponders on the aircraft are addressed by the ground stations selectively, i.e., if the interrogation signals transmitted by the ground stations are responded to not by all transponders within the range of a ground station, but only by those whose address was contained in the interrogation signal. The addresses are known to the ground stations either from the flight plan or from squitter signals transmitted by the transponders at intervals of 0.8 to 1.2 seconds.

SSR systems as described above suffer from the drawback that information can be exchanged between ground station and airborne station only if the lobe of the rotating antenna sweeps the area in which the respective aircraft and, hence, the respective transponder are located. With increasing air traffic density, this is a constraint that may affect safety.

A solution provided by the present invention for synchronizing the interrogators in the secondary radar system uses a principle that is known for performing time comparisons between satellite ground stations used for communication. (See, for example, the article by D. Kirchner et al. entitled: "A Two-Way Time Transfer Experiment Via ESC-1 Using the Mitrex Modem" appearing in "IEEE Transactions on Instrumentation and Measurement", Vol. 37, No. 3, September 1988, pages 414–417). Also see the article by David Howe in the same IEEE publication, pages 418–423 entitled "High-Accuracy Time Transfer via Geostationary Satellites: Preliminary Results".

SUMMARY OF THE INVENTION

It is the object of the invention to improve an SSR system so that transmission of information between ground station and airborne station is possible at any time.

This object is attained by providing an SSR system, for Mode S operation, comprising: a plurality of ground-based interrogators which transmit interrogation signals and receive reply signals via a plurality of antennas; a plurality of airborne stations which transmit a signal containing the identity of an airborne object equipped with the airborne station; and wherein the interrogators are synchronized to a system time with a fixed time frame; computing means connected to said interrogators for determining a position of an airborne object from at least three arrival times of the reply signals from said airborne station as measured by at least three interrogators, operating in accordance with a hyperbolic space positioning function.

Another object of the invention is obtained by providing an SSR system for Mode S operation, comprising: a plurality of ground-based interrogators which transmit interrogation signals and receive reply signals with a plurality of antennas; at least one airborne station which transmits a reply signal in response to a received interrogation signal; measuring means in the interrogators for measuring a time interval between the transmission of the interrogation signals and the reception of the reply signals; and wherein the interrogators are interconnected and synchronized to a system time with a fixed time frame, said interrogators including control means which, after measurement of a signal transmit time from an interrogator to an airborne station and return, determine a time for transmission of a further interrogation signal such that the reply signal transmitted by the airborne station will return to the interrogator within the system time frame.

The system according to the invention has the advantage that acquisition of aircraft is possible without transmission of interrogation signals. In an SSR system of the present invention, a position fix is then obtained with the aid of the distance from the aircraft to at least two ground stations and by means of the altitude data contained in the reply signals. This eliminates the need for the costly and failure-prone rotating antennas. In an SSR system of the present invention, where no transmission of altitude information to a ground station is required, a third ground station is necessary to obtain a position fix.

Another object of the present invention is to provide a method and apparatus for maintaining synchronism of the interrogators such that clock deviations and/or time measurement errors in the secondary radar system can be very accurately corrected without the use of an additional, external apparatus. A cellular configuration of the network of ground stations is disclosed which permits surveillance of a large airspace and, thus, provides increased safety. Another advantageous feature of the present invention permits distance measurements from aircraft to aircraft by simple means.

A further advantageous feature of the invention, makes it possible to check the position fix and to determine any deviation of the delay maintained in the airborne equipment between the receipt of an interrogation signal and the transmission of a reply signal from a predetermined value.

According to another feature of the present invention, all interrogators except the one which transmits the interrogation signal may be pure receiver units or operate as such. This is particularly advantageous if, the SSR system according to the invention is to permit precise altitude measurements, e.g., in the approach zones of airports. To increase the accuracy of low-altitude measurements if the interrogators are separated by great distances, low-cost, pure receiver units may be additionally installed at short distances from the active interrogator and used for altitude measurements from the ground.

According to yet another feature of the present invention, the SSR system can also be used independently of a cellular network to determine the altitude of airborne-station-equipped aircraft or missiles from the ground.

A further advantage of the method according the invention for synchronizing the ground stations is that, apart from the devices required for the secondary radar Mode S operation, no further devices are needed for the correction needed to maintain synchronism of the ground stations and the clocks therewithin. The necessary calculations and data transmissions are performed by existing processors and transmission equipment, respectively, already present in the secondary radar system.

A round trip signal transit time from a master station to at least one other ground station is calculated. This makes the synchronization of the clocks of the at least one ground station with the clock of the master station particularly simple. The clocks of the ground stations can be prevented from deviating from each other too much during times in which no airborne station is available for interrogation and for transmitting a reply signal.

BRIEF DESCRIPTION OF THE DRAWINGS

An embodiment of the invention will now be described with reference to the accompanying drawings, in which.

DETAILED DESCRIPTION

Figure 1A:
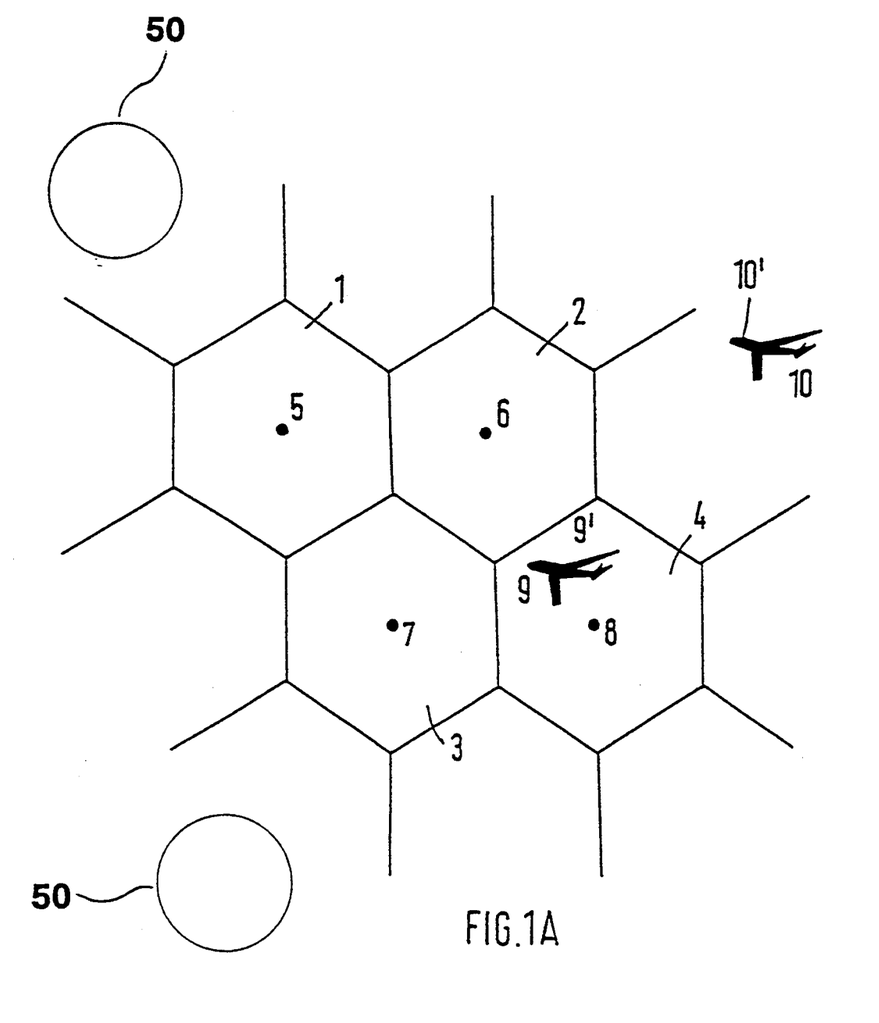
FIG. 1a shows a network of ground stations with interrogators.

In FIG. 1a, a network of ground stations and interrogators, the reference characters 1, 2, 3, and 4 denote hexagonal cells of a cellular network. The overall network consists of more than four cells, as indicated in the figure by the open cells. At the center of each cell is a ground station. The ground stations are designated 5, 6, 7, and 8.

Above the cellular network of ground stations, there are two aircraft 9 and 10. The aircraft 9 is equipped with a transponder 9', and the aircraft 10 with a transponder 10'. The ground stations 5, 6, 7, and 8 contain interrogators which transmit interrogation pulses modulated onto a high-frequency carrier. If these pulses are received by the transponders 9' and 10', the latter will reply with the transmission of reply signals. In mode S - "S" stands for "selective" - the interrogation signal transmitted by a ground station includes an address which allows individual aircraft (transponders) to be addressed on a selective basis. Geostationary satellites 50 are used to synchronize the interrogators to a system time.

Figure 1B:
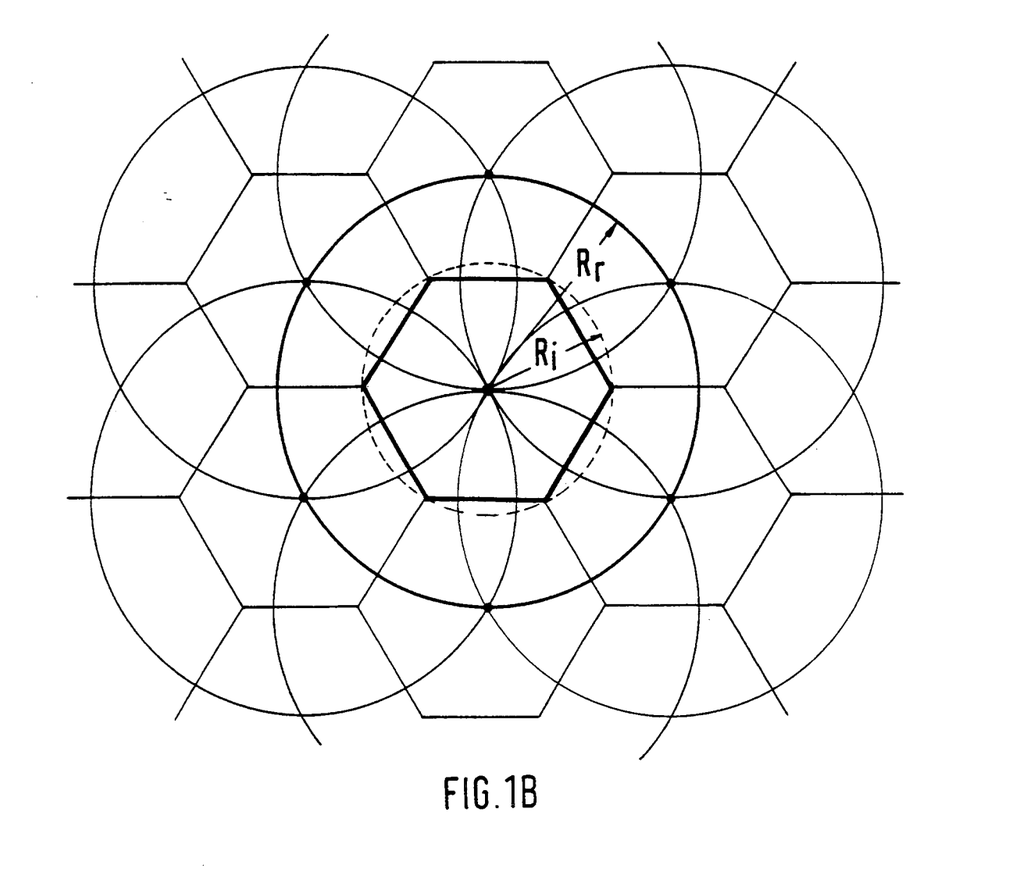
FIG. 1b shows characteristic distances for active and passive operation of interrogators.

FIG. 1b illustrates the relative proportions of the cells of FIG. 1a. In the embodiment being described here, the operational range $R_i$ for active interrogations from a ground station is 120 km, while the reception range $R_r$ is twice as great, i.e., 240 km.

Figure 2:
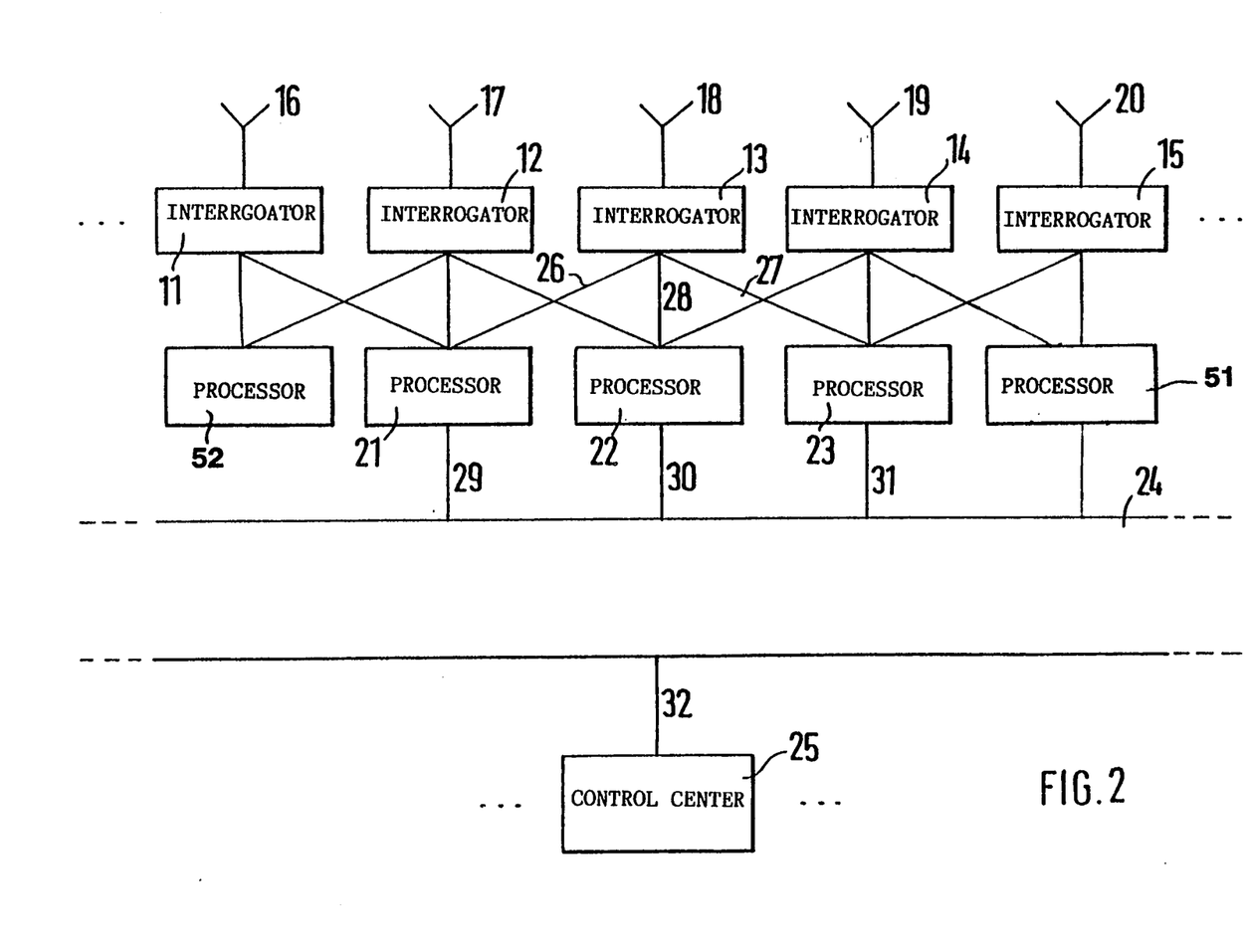
FIG. 2 shows the system architecture.

FIG. 2 is a schematic of the system architecture. Reference numerals 11 to 15 denote interrogators as are contained in the ground stations 5, 6, 7 and 8 of FIG. 1a. The interrogator 15 may be used as an additional (fourth or fifth) interrogator in the system. Associated with each interrogator is an antenna for transmitting the interrogation signals and receiving the reply signals. The antennas are designated 16 to 20. The interrogators 11 to 15 generate the interrogation signals and process the reply signals. Each interrogator is connected to one or more processors 21, 22, 23, 51 and 52.2. In the embodiment shown, the interrogator 13 is connected to the processor 21 by a line 26, to the processor 22 by a line 28, and to the processor 23 by a line 27. The processors are connected to a common data line 24. The common data line 24 is connected to a control center 25 by an interconnecting line 32. The system of FIG. 2 operates as follows. At intervals between 0.8 and 1.2 seconds, the transponders 9' and 10' on the aircraft 9 and 10 (FIG. 1a) send out squitter signals which contain the identity of the aircraft in coded form. If at least three ground stations synchronized to the system time, e.g., the ground stations 6, 7, and 8 in FIG. 1a, receive a squitter signal from the transponder 9', they will coarsely determine the transponder's location from the differences between the times of arrival of the signals using the hyperbolic fixing scheme. In FIG. 1a, the aircraft 9 with the transponder 9' is in cell 4, which contains the ground station 8. This cell now becomes an active cell. The interrogator in the ground station sends out an interrogation signal addressed directly to the transponder 9'. The interrogation signal is received, and after a fixed delay, the transponder 9' responds by transmitting a reply signal. The time interval between the transmission of the interrogation signal and the reception of the reply signal is measured in the ground station. As the propagation velocity and a transponder equipment delay are known, this time interval provides the distance of the aircraft from the ground station. In the embodiment being described, the interrogator 11 of FIG. 2 is in the ground station 8 of FIG. 1a. After determination of the signal transit time or the distance, the ground station 11 passes this information to several processors, here the processor 21. All interrogators 11 to 15 are synchronized to the same fixed system time. This system time is transmitted via geostationary satellites 50 of FIG. 1A, for example. The additional interrogator 15 measures the distance to an airborne station whose position was already determined by at least three (11-14) of the other interrogators, and, based on the difference between the measured distance and a distance value calculated from the coordinates of the position of the airborne station and the additional interrogator 15, determines a temporal correction value which represents any deviation of an elapsed time between receipt of an interrogation signal and transmission of a reply signal from a predetermined value.

Figure 4A:
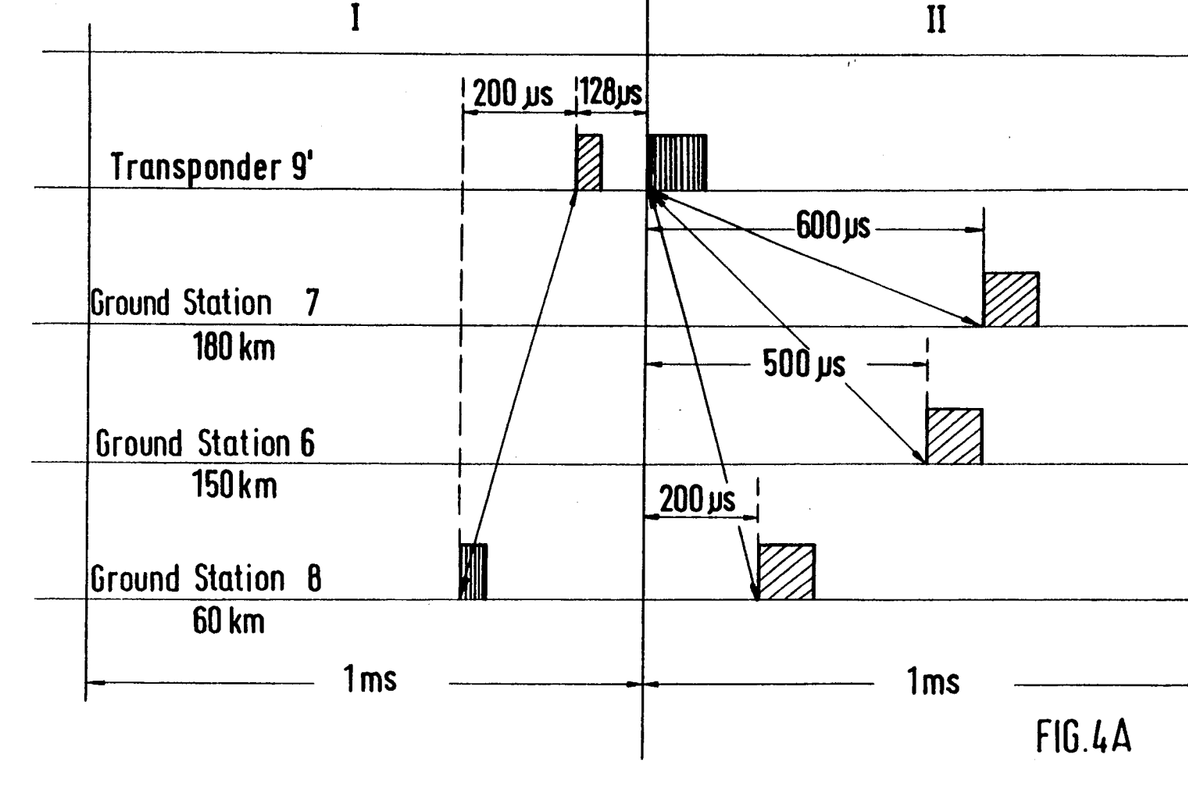
FIG. 4a is a timing diagram with the interrogation pulses placed earlier in time (pre-delay); one airborne station, several ground station.

FIG. 4a shows a two-millisecond frame of the system time common to all interrogators, which consists of parts I and II. In part I, the ground stations transmit, and in part II, they receive. It is assumed that after coarse location of the aircraft 9, the ground station 8 in cell 4 becomes the active ground station. Ground station 8 has sent out an interrogation signal and has determined a distance of 60 km to the aircraft 9 from the time difference between transmission of the interrogation signal and reception of the reply signal. With the aid of one of the processors 21, 22, 23, the time of transmission of an interrogation pulse is then placed 328 microseconds from the beginning of part II of the time frame. The black blocks of FIG. 4a designate transmitted pulses, and the hatched blocks received pulses. The narrow blocks are signals sent out by the ground stations, and the wide blocks are signals from the transponders. The transit time of the interrogation signal transmitted by the ground station 8 is 200 microseconds. After a delay of 128 microseconds, i.e., precisely at the beginning of part II of the time frame, the transponder 9' transmits a reply signal. This reply signal arrives at the ground station 8, which is 60 km from the transponder, after 200 microseconds. The same reply signal arrives at the ground station 7, which is 180 km away, after 600 microseconds. And the ground station 6, which is 150 km away, receives the signal after 500 microseconds. As the time of transmission of the interrogation signal from the ground station 8 is chosen so that the reply signal generated by the transponder is located exactly at the beginning of part II of a time frame, the times of arrival of the reply signals at the ground stations 6, 7, and 8 are a direct measure of the distances from the ground stations to the transponder 9'. The only active ground station is ground station 8. The ground stations 6 and 7 are passive and only receive the reply signal. One of the processors 21, 22, 23 to which the distances from the transponder 9' to two ground stations are communicated can immediately determine therefrom the bearing of the aircraft 9 and, together with the altitude data contained in the reply signal, the position of the aircraft. If the transponder 9' did not transmit its reply signal at the beginning of a time frame (or at a fixed reference point within the time frame), at least two ground stations would have to become active to determine the position of the aircraft.

Figure 4B:
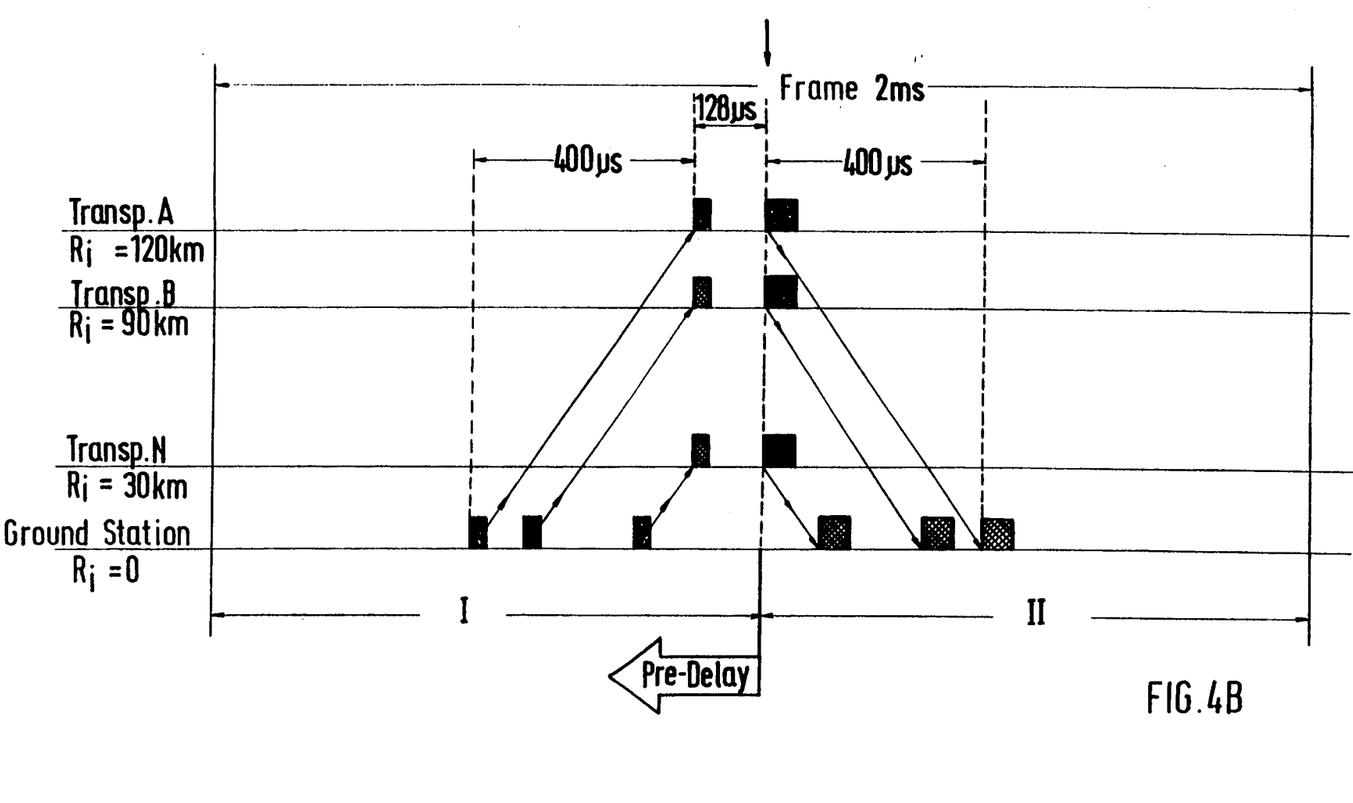
FIG. 4b is a timing diagram similar to FIG. 4a; one ground station, several airborne stations.

FIG. 4b shows a variant of the timing diagram described with the aid of FIG. 4a. Here, three aircraft are within the coverage area of a ground station, which fact is already known to the latter from the above-described coarse location with the aid of the squitter signals. In a first interrogation-reply cycle, the ground station has determined the distances to these aircraft, namely 120 km, 90 km, and 30 km. Then it transmits interrogation pulses to the transponders which are located 528 microseconds, 428 microseconds, and 228 microseconds before the beginning of a new time frame. As a result, all three transponders transmit their reply signals exactly at the beginning of the subsequent time frame. The times of arrival of the reply signals at the ground stations are now directly proportional to the distances to the three transponders. This applies to all ground station in the network. Thus, one active ground station suffices to determine the positions of the aircraft by measuring the times of arrival of the reply signals. The aircraft position data computed by the processors are placed on the common data line 24 and are thus available for evaluation at the control center 25.

Figure 3:
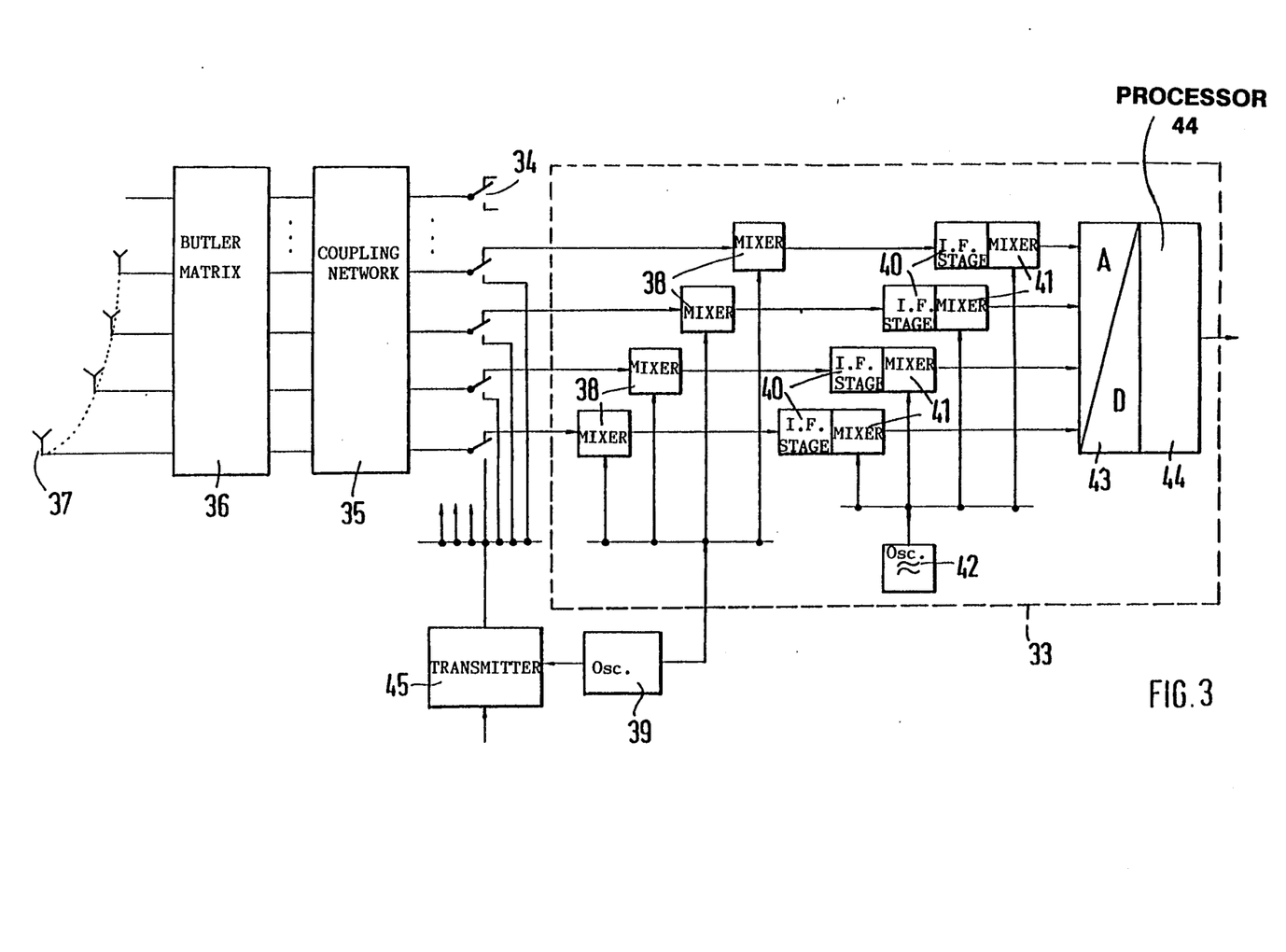
FIG. 3 shows the construction of a ground station with antenna.

FIG. 3 shows the construction of a ground station. Each one of the interrogators 11-15 shown in FIG. 2 is connected to more than one of the processors 21, 22, 23, 51 and 52.2. A multichannel receiver 33 is connected via a set of switches 34, a coupling network 35, and a Butler matrix 36 to an antenna 37 consisting of 16 radiating elements. The 16 radiating elements of the antenna 37 are arranged on a circle with a diameter of 1 to 2 m. The receiver 33 includes 16 first mixers 38, of which only four are shown here. These first mixers 38 mix the signal from the antenna 37 with the output signal from an oscillator 39. The switch position shown for the switch 34 is the receive position. The outputs of the first mixers 38 are applied to intermediate-frequency stages 40, whose outputs are mixed in mixers 41 with the signal from an oscillator 42. The outputs of the mixers 41 are digitized in an analog-to-digital converter 43 and fed to a digital signal processor 44. The output of the digital signal processor 44 is fed to one or more of the processors 21 to 23 and to transmitter 45. During transmission, one of the switches 34 is in the switch position not shown. In that case, the antenna 37 is supplied with the output signals from a transmitter 45 for the desired direction. The carrier signal for the transmitter 45 is the output signal from the oscillator 39. The information to be transmitted by the transmitter originates from one of the processors 21 to 23. The overall system can now be operated so that an aircraft whose position has been determined remains in contact with the ground station whose cell it is flying over. At the cell boundary, handover from one ground station to the next takes place under control of the data line 24. As the ground stations use antennas with overlapping, fanlike radiation patterns, information can be exchanged between ground station and transponder at any time. The limitation imposed by a rotating unidirectional antenna is eliminated.

The secondary radar system described can also be used to inform aircraft about distances to other airborne aircraft. This is known under the name "Airborne Collision Avoidance System" (ACAS). It is assumed here that an aircraft was coarsely located with the aid of squitter signals. Then, the ground station in whose cell the aircraft is located sends out an interrogation signal such that the reply signal transmitted by the aircraft falls within the common system time frame. Since not only the ground stations but also the transponders are synchronized to the common system time, it suffices that computing means 60 and 61 shown in FIG. 1A respectively provided on airborne stations 9 and 10 are provided to evaluate the times of arrival of the reply signals from the activated transponder in other aircraft if the distance between the aircraft carrying the activated transponder and the other aircraft is to be determined.

In the secondary radar system for Mode S operation described with reference to FIGS. 1(a), 1(b), 2, 3, 4(a) and 4(b), the position of an aircraft is determined from stored arrival times of a reply signal from a station aboard the aircraft. The reply signal is transmitted in response to an interrogation signal from a ground station. The reply signal is received at the receivers of at least three ground stations situated at different geographical locations by using hyperbolic position finding techniques.

As shown in FIG. 2, interrogators 11-15 in the ground stations must operate in strict synchronism so that signal transmission times and eventually distances can be calculated from the stored interrogation and arrival times associated with each other.

To maintain synchronism, the present invention synchronizes the interrogators in the ground stations with the aid of geostationary satellites 50 of FIG. 1A. Such synchronization therefore requires that all ground station have receivers for the transmitted time signals and antennas for satellite reception.

Figure 5:
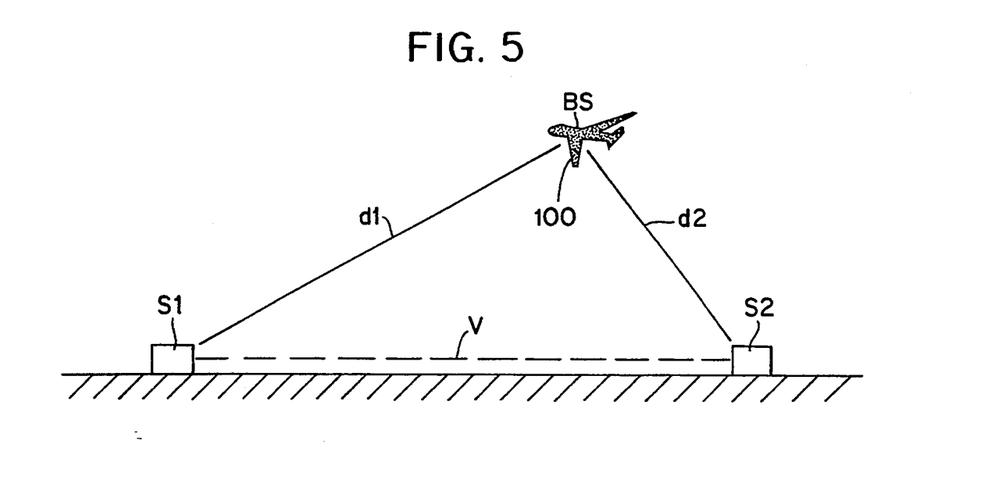
FIG. 5 shows a synchronism principle used to correct time measurement errors in the present invention in a system having two ground stations.

Referring to FIG. 5, two ground stations S1, S2 each having an interrogator therein are interconnected by a data link V. Located within the coverages of both interrogators is an aircraft 100 with an airborne station BS therein. Airborne station BS, after a fixed delay following the reception of an interrogation signal transmitted by one of the interrogators, will transmit a reply signal which will be received by both interrogators. The distance from the airborne station BS to the interrogator of the ground station S1 is d1, and that to the interrogator of the ground station S2 is d2.

The interrogators of both ground stations are equipped with highly accurate clocks which operate synchronously in a fixed system time frame. These clocks serve as a time standard for measurements of the transit times of interrogation signals and receipt of reply signals. With these clocks, the time of transmission of a predetermined pulse edge of an interrogation signal and the time of reception of a likewise predetermined pulse edge of a reply signal transmitted by the airborne station BS, after a fixed delay, can be precisely measured in relation to a synchronization mark of the system time frame. The time elapsed between the transmission of an interrogation signal and the arrival time of an associated replay signal can then be calculated at the interrogating ground station (S1 or S2). If the receiving station is not the interrogating station, the arrival time must in turn be transmitted to the interrogating station.

The calculated elapsed time includes the signal transit times between the interrogating ground station S1 or S2 and the airborne station BS, $t_1$, and between the airborne station BS and the receiving ground station, $t_2$, and the fixed delay $t_0$ in the airborne station BS. Depending on which ground station S1 and S2 is interrogating and in which ground station the time of reception of the reply signal is being determined, the signal transit time comprises the fixed delay $t_0$ and twice the distance d1 (interrogation and reply evaluation by ground station S1), the distance d1+d2 (interrogation by ground station S1, reply evaluation by ground station S2) or twice the distance d2 (interrogation and reply evaluation by ground station S2). If the reply signal is evaluated by the interrogators of both ground stations (S1 and S2), and the measured signal transit times are exchanged via the data link V, and the distances d1 and d2 can be calculated, since the wave velocity (speed of light c) is known. To determine the position of the aircraft 100 using a hyperbolic system, at least one additional ground station is necessary whose clock must also be synchronized with the system time frame.

Mutual synchronization of the interrogators (S1 and S2) necessitates measuring the existing clock deviation. To do this, two successive interrogation/reply cycles with signal transmissions taking place over the same distances in opposite directions is required. For example, the reception at the station S2 of a reply signal from the airborne station BS which was elicited by an interrogation signal transmitted from the interrogator S1 is followed, after a predetermined waiting time, by an interrogation signal that is transmitted from the station S2 and the reception of the corresponding reply signal from the airborne station BS by the ground station S1. The time measured between the transmission of the interrogation signal and the reception of the associated reply signal is the same in both directions provided the interrogators operate in exact synchronism and the interrogations follow in such rapid succession that any distance traveled by the airborne station in the interim will be of no consequence. If the synchronization is not correct, a time error will be measured for both directions of transmission. The measured error is the same for both directions of transmission but has a different sign for each direction.

If $t_1$ is the signal transit time over the distance d1 in FIG. 5, $t_2$ the signal transit time over the distance d2, and $t_0$ the delay in the airborne station BS, the total time for an interrogation/reply cycle directed from ground station S1 to ground station S2 or oppositely is $$T_{1,2}=T_{2,1}=t_1+t_0+t_2$$

In the presence of a synchronization error $t_f$ (e.g., lag of the clock of the ground station S2), a total time of $$T_{1,2}=t_1+t_0t_2-t_f$$

will be measured for the interrogation/reply cycle initiated by the station S1, while a total time of $$T_{2,1}+t_2+t_0+t_1+t_f$$

will be measured for the interrogation/reply cycle in the opposite direction. The two total times thus differ by 2 $t_f$. Accordingly, the deviation of the clock in the ground station S2 from the clock in the ground station S1 is $t_f$, half the measured difference.

If it is possible to readjust the clock in the ground station S2. This can be done after transmission of the magnitude and sign of the detected time error $t_f$ to the station S2. Exact synchronization of the two clocks is thus restored. The deviation can also be stored and taken into account as a correction value in calculating distance for the purpose of locating the position of the aircraft 100. Thus, the erroneous measured value need not be discarded.

The delay in the airborne station BS does not enter into the measured total time. It is therefore inconsequential if the delays in the airborne station of different aircraft are not exactly equal. The delay in a single airborne station BS, however, should be so constant that it does not measurably change during two successive interrogation/reply cycles.

In practice, this requirement cannot always be met. Delay jitter occurs which, according to the regulations of the ICAO for secondary radar systems, must not exceed 50 nanoseconds. In addition, randomly distributed measurement inaccuracies are also likely to occur when measuring the times of reception in the interrogators of the ground stations S1 and S2. These randomly distributed transit-time and measurement errors can be reduced by making multiple measurements and averaging the measured values.

Errors in the measured total times may also result from the motion of the airborne station BS and the resulting signal-path change during the time between two successive interrogation/reply cycles. Such errors will remain small, if the waiting time between the successive interrogation/reply cycles is very short, e.g., on the order of 1 millisecond. Time-measurement errors will then remain below 1 nanosecond, even with an unfavorable spatial constellation of the positions of ground stations S1 and S2 and the airborne station BS (i.e., the airborne station is vertically above one of the ground stations).

Figure 6:
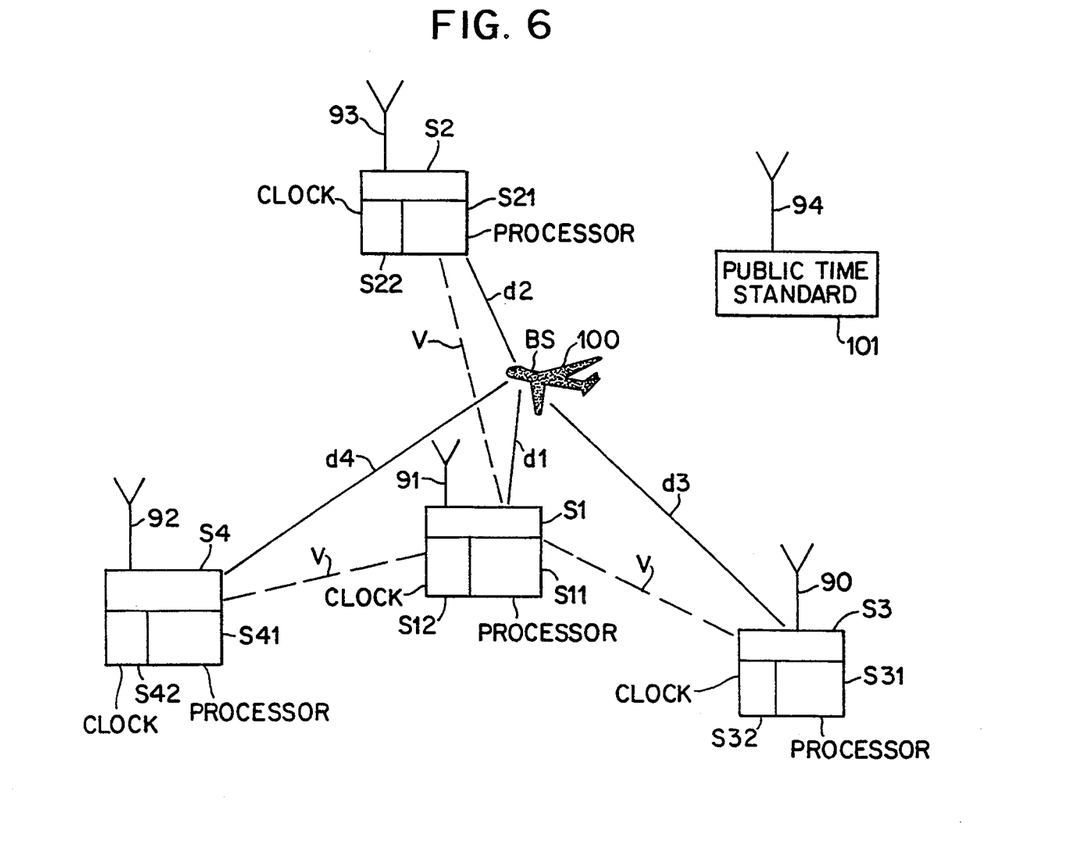
FIG. 6 shows a secondary radar system with several ground stations with synchronized clocks.

FIG. 6 shows a group of ground stations S1, S2, S3 and S4 of a cellular network. In such a secondary radar system, the position of an aircraft 100 (airborne station BS) is determined by measuring the times required for a reply signal transmitted by the aircraft 100, in response to an interrogation signal from one of the ground stations, to travel to at least three of the ground stations. If, according to an embodiment of the present invention, the flight altitude is to be additionally determined by evaluating the transit times of the reply signals, a fourth, synchronously operating ground station is required. To synchronize the interrogators of all required ground stations or to correct measurement errors caused by deviations of the clocks, it is necessary to organize the interrogation/reply mode of the ground stations in such a manner that all ground stations send interrogation signals to the same airborne station cyclically and in as even a distribution as possible, and such that this does not result in intersections of signals at the receivers or in signals arriving at an airborne receiver in aircraft 100 when the latter is turned OFF during the transmission of a reply signal.

In a group of ground stations as shown in FIG. 6, it is therefore advantageous to operate one of the ground stations as a master station (or to provide an additional master station), and to treat the timing signal of the master station as the system timing, and to synchronize the clocks of the other interrogators with the system time of the master station. The calculation of the various distances and the hyperbolic position finding method are then carried out in a computing device in the master station after all measured values have been transmitted to this master station.

In FIG. 6, the ground stations S1 to S4 operate together. Clocks S12, S22, S32 and S42 are provided in ground station S1-S4. Processors S11, S21, S31 and S41 are also provided in ground stations S1-S4. The ground station S1 is the master station, in which the signal transit times needed for position determination are determined from the measured values of all ground stations, and in which a position determination for aircraft 100 is performed. The clocks S12, S22, S32 and S42 of all ground stations S1 to S4 are first coarsely synchronized with a system time which is provided by the master ground station S1 to the other ground stations S2-S4, e.g., via data links V which exist between the stations. Synchronization with the aid of a public time standard transmitter 101 having a transmitting antenna 100 or with the aid of a GPS timing signal is also possible. Signals transmitted from transmitter 101 are received by antenna 90-93 of the ground stations S1-S4. Starting from a point 0 of the system time or any other agreed point of the public time standard, the ground stations transmit interrogation signals at fixed instants which are 1 millisecond apart, for example. If the master station S1, for example, transmits at the instant 0, the ground station S2 will follow at instant 0+1, the ground station S3 at the instant 0+2, and finally, after 3 ms, the ground station S4. After a fixed waiting time (e.g., 1 s), the master station S1 begins a new interrogation cycle. In this case, the coarse synchronization of the ground stations must be at least good enough so that the sequence of the stations in the interrogation cycle will be preserved and no overlapping of the interrogation signals will occur.

If an aircraft 100 whose airborne station BS (transponder) is ON comes near to the stations S1 to S4, the stations will receive squitter signals from the airborne station BS. From these squitter signals, stations S1 to S4 obtain the identification of the aircraft, which is used to selectively address the airborne station.

Also, a first coarse determination of the position of the aircraft 100 can be performed with the aid of the arrival times of the squitter signals, which are registered in the ground stations.

When the airborne station BS is addressed on a selective basis, it will, after a fixed delay $t_0$, transmit in response to each interrogation signal containing its identification, a reply signal whose respective arrival time in the individual ground stations is registered and transmitted to the master station S1. It is thus possible to determine time errors and to correct the synchronization of the ground stations, described above for pairs of ground stations, (i.e., ground stations S1/S2, S1/S3, S1/S4, S2/S3, S2/S4, and S3/S4). The pairs of ground stations can be selected for example, by processors S11, S21, S31 and S41. The pairs can be cylically changed by charging the addresses of the ground stations S1-S4 which are enabled to transmit by the processor of the master station S1. The initially possibly large synchronization error can thus be reduced step by step, so that after a few seconds, all ground stations involved, even if the ground stations S1 to S4 are used without connection with an areawide network, e.g., for air space surveillance, will be very accurately synchronized with the system time provided by the master station S1.

Various changes and modifications may be made, and features described in connection with any one of the embodiments may be used with any of the others, within the scope of the inventive concept.

I claim:

1. A secondary radar system for Mode S operation, comprising:
    a plurality of ground stations, each ground station including a ground-based interrogator which transmits a plurality of interrogation signals and receives a plurality of reply signals;
    a plurality of antennas respectively connected to said interrogators;
    at least one airborne station that transmits a reply signal in response to a received interrogation signal;
    measuring means, connected to each of the interrogators, for measuring a time interval between a transmission of an interrogation signal and a reception of a reply signal;
    synchronizing means for synchronizing the interrogator in each ground station to a system time within a fixed time frame;
    said measuring means, including computing means for computing a signal transmit time from a respective one of said interrogators to which a respective measuring means is connected, to the at least one airborne station, and return; and means provided in each of said interrogators, and responsive to the signal transit time computed by said computing means, for adjusting a time of transmission of a further interrogation signal from said respective one of said interrogators such that a further reply signal transmitted by the at least one airborne station, responsive to the further interrogation signal, will be received by said interrogators within the fixed time frame;

the further reply signals from the at least one airborne station, responsive to said further interrogation signal, being transmitted at a common time back to said interrogators.

2. A secondary radar system as claimed in claim 1, further comprising:

a plurality of cells formed into a cellular network, each of said plurality of cells having a respective one of said interrogators positioned therein;

said respective one of said interrogators in a respective cell in which the airborne station is located and said computing means of said measuring means connected to said respective one of said interrogators, computing said signal transit time from said respective cell to said at least one airborne station, and return.

3. A secondary radar system as claimed in claim 1, wherein:

the plurality of antennas are positioned at the interrogators; and each antenna comprises a plurality of radiating elements fed through at least one network in such a way that a fan of overlapping radiation patterns is produced in a horizontal plane.

4. A secondary radar system as claimed in claim 1, wherein:

said computing means of said measuring means is connected to at least three interrogators for computing a position of said at least one airborne station from the reply signal transmitted from said at least one airborne station to said at least three interrogators, within the fixed time frame.

5. A secondary radar system as claimed in claim 1, further comprising a cellular network having a plurality of cells, each of said plurality of cells having at least one of said interrogators therein.

6. A secondary radar system as claimed in claim 1, further comprising:

means in each of said plurality of ground stations and each of said at least one airborne stations for exchanging information.

7. A secondary radar system as claimed in claim 1, wherein each airborne station includes a computing means for computing a plurality of distances from the reply and further reply signals radiated within the system time frame.

8. A secondary radar system as claimed in claim 1, wherein:

the plurality of antennas are positioned at the interrogators; and each antenna comprises a plurality of radiating elements fed through at least one network in such a way that a fan of overlapping radiation patterns is produced in a horizontal plane. station equipped with a means for transmitting reply signals in response to the received interrogation signals.

9. A secondary radar system as claimed in claim 1, further comprising at least one geostationary satellite for synchronizing the interrogators to the system time.

10. A secondary radar system as claimed in claim 1, further comprising:

at least one additional interrogator connected to at least one measuring means having a computing means for computing a distance to an airborne station whose position was previously computed by at least three other computing means; and said computing means of said at least one measuring means computing a difference between a previously computed distance value to the previously computed position of the airborne station and a distance value calculated from a plurality of coordinates of a present position of the airborne station, and based on the thus computed difference, said computing means of said at least one measuring means computes a temporal correction value which represents a deviation of an elapsed time between receipt of an interrogation signal and transmission of a reply signal from a predetermined value.

11. A secondary radar system as claimed in claim 10, wherein all interrogators but one are pure receiver units or operate as pure receiver units.

12. A secondary radar system as claimed in claim 10, wherein the system includes means for determining an altitude of the airborne station equipped with a means for transmitting reply signals in response to the received interrogation signals.

13. In a secondary radar system for Mode S operation, having:

a plurality of ground stations, each ground station including a clock and a ground-based interrogator which transmits a plurality of interrogation signals and receives a plurality of first reply signals;

a plurality of antennas respectively connected to said interrogators;

at least one airborne station that transmits a first reply signal in response to a received interrogation signal;

measuring means, connected to each of the interrogators, for measuring a time interval between a transmission of an interrogation signal and a reception of a first reply signal;

synchronizing means for synchronizing the interrogator in each ground station to a system time within a fixed time frame;

said measuring means including computing means for computing a signal transit time from a respective one of said interrogators to which a respective measuring means is connected, to the at least one airborne station, and return; and means provided in each of said interrogators, and responsive to the signal transit time computed by said computing means, for adjusting a time of transmission of a further interrogation signal from said respective one of said interrogators such that a further first reply signal transmitted by the at least one airborne station, responsive to the further interrogation signal, will be received by said interrogators within the fixed time frame;

the further first reply signals from the at least one airborne station, responsive to said further interrogation signal, being transmitted at a common time back to said interrogators;

a method of correcting measurement errors caused by clock deviations in the plurality of ground stations, comprising the steps of:

transmitting toward said at least one airborne station from all the ground stations (S1–S4) which are used to determine a position of the at least one airborne station, a plurality of transmit interrogation signals in a cyclic sequence and at fixed points in time within another time frame that is predetermined by the clock of one of said plurality of ground stations (S1);

receiving second reply signals from said at least one airborne station at all said ground stations, said second reply signals being responsive to said plurality of transmit interrogation signals;

determining at each ground station receiving said second reply signals, a time of reception of said second reply signals;

forming said plurality of ground stations into different respective pairs of ground stations;

each of said different respective pairs of ground stations comprising one of said ground stations and one of a master ground station and another one of said ground stations;

exchanging data between the ground stations of a selected pair of ground stations, said exchanged data representing an elapsed time that is calculated between a transmission of a transmit interrogation signal by one of said selected pair of ground stations and a reception by the other one of said selected pairs of ground stations of a second reply signal from said airborne station that is responsive to said transmit interrogation signal transmitted by said one of said selected pair of ground stations;

calculating a first elapsed time for said selected pair of ground stations beginning at a first time when said one ground station of said selected pair of ground stations transmits a first transmit interrogation signal and ending at a second time when the other one of said selected pair of ground stations receives a second reply signal responsive to the first transmit interrogation signal transmitted by said one ground station;

calculating a second elapsed beginning at another first time when said other one of said ground stations of said selected pair of ground stations transmits a second transmit interrogation signal and ending when the one ground station of said selected pair of ground stations receives another second reply signal from said airborne station that is responsive to said second transmit interrogation signal transmitted from said other ground station; and wherein one-half of an absolute value of a difference between the first and second calculated elapsed times is representative of a deviation between the clocks of the ground stations of said selected pair of ground stations; and then adjusting a determination of a position of said at least one airborne station based on said deviation between said clocks.

14. The method of claim 13, wherein:

the step of forming different pairs of ground stations comprises forming each of said pairs so that one (S1) of the ground stations in each different pair of ground stations is the master ground station; and further comprising determining any deviation of the clocks of any selected pair of ground stations from each other in said master station; and wherein:

said exchanging step comprises communicating data from the master ground station to said other one of said ground station (S2, S3 or S4) of said selected pair, said exchanged data being used by said other one of said ground stations to correct the clock therewithin.

15. The method of claim 13, further comprising transmitting a clock signal of one of the ground stations over a plurality of data links (V) to all of a remaining plurality of ground stations.

16. The method of claim 14, further comprising transmitting a clock signal of one of the ground stations over a plurality of data links (V) to all of a remaining plurality of ground stations.

17. The method of claim 13, further comprising:

receiving at all of said plurality of ground stations a time standard signal transmitted from a public time standard transmitter; and adjusting the clock in each ground station to said time standard signal.

18. The method of claim 14, further comprising:

receiving at all of said plurality of ground stations a time standard signal transmitted from a public time standard transmitter; and adjusting the clock in each ground station to said time standard signal.

19. The method of claim 13, further comprising:

forming each second reply signal to include data identifying the ground station that transmitted a transit interrogation signal to which said second reply signal is responsive.

20. The method of claim 14, further comprising:

forming each second reply signal to include data, identifying the ground station that transmitted a transit interrogation signal to which said second reply signal is responsive.

21. A secondary radar system for Mode S operation, comprising:

a plurality of ground stations, each ground station including a clock and a ground-based interrogator which transmits a plurality of interrogation signals and receives a plurality of first reply signals;

a plurality of antennas respectively connected to said interrogators;

at least one airborne station that transmits a first reply signal in response to a received interrogation signal;

measuring means, connected to each of the interrogators, for measuring a time interval between a transmission of an interrogation signal and a reception of a first reply signal;

synchronizing means for synchronizing the interrogator in each ground station to a system time within a fixed time frame;

said measuring means including computing means for computing a signal transit time from a respective one of said interrogators to which a respective measuring means is connected, to the at least one airborne station, and return;

means provided in each of said interrogators, and responsive to the signal transit time computed by said computing means, for adjusting a time of transmission of a further interrogation signal from said respective one of said interrogators such that a further first reply signal transmitted by the at least one airborne station, responsive to the further interrogation signal, will be received by said interrogators within the fixed time frame;

the further first reply signals from the at least one airborne station, responsive to said further interrogation signal, being transmitted at a common time back to said interrogators; and correcting means for correcting pairs of clocks of said ground stations, said correcting means including:

deviation determining means for determining any deviation between the clocks of selected pairs of said ground stations; and means for correcting a determination of a position of said at least one airborne station based on the deviation determined by said deviation determining means.

22. The system of claim 21, further comprising data links (V) for forwarding a clock signal of one of the ground stations to all of a remaining plurality of ground stations.

23. The system of claim 21, wherein said plurality of antennas receive at all of said plurality of ground stations, a time standard signal transmitted from a public time standard transmitter; and the clock in each ground station being adjusted to said time standard signal.

* * * * *

UNITED STATES PATENT AND TRADEMARK OFFICE
CERTIFICATE OF CORRECTION

PATENT NO. : 5,363,109
DATED : November 8, 1994
INVENTOR(S) : Gunter HOFGEN et al.

It is certified that error appears in the above-indentified patent and that said Letters Patent is hereby corrected as shown below:

Title Page, Item [73] Assignee, line 1,
replace "Sel" with --SEL--;

Item [56] References Cited,
under "U.S. PATENT DOCUMENTS" insert
--4,357,609  11/1992  Spencer--;

under "OTHER PUBLICATIONS" insert

--David A. Howe, "HIGH-ACCURACY TIME TRANSFER VIA GEOSTATIONARY SATELLITES: PRELIMINARY RESULTS", September 1988, Vol. 37, No. 3, IEEE Transactions on Instrumentation and Measurement Dieter Kirchner, "A TWO-WAY TIME TRANSFER EXPERIMENT VIA ECS-1 USING THE MITREX MODEM", September 1988, Vol. 37, No. 3, IEEE Transactions on Instrumentation and Measurement--.

UNITED STATES PATENT AND TRADEMARK OFFICE
CERTIFICATE OF CORRECTION

PATENT NO. : 5,363,109
DATED : November 8, 1994
INVENTOR(S) : Gunter HOFGEN et al.

It is certified that error appears in the above-indentified patent and that said Letters Patent is hereby corrected as shown below:

Column 11, line 66 (claim 8, line 8), delete "station equipped";

, lines 67 and 68, delete in their entirety.

Signed and Sealed this

Fifteenth Day of April, 1997

Attest:

BRUCE LEHMAN

Attesting Officer      Commissioner of Patents and Trademarks